(12) United States Patent
Naito et al.

(10) Patent No.: US 8,102,829 B2
(45) Date of Patent: Jan. 24, 2012

(54) WIRELESS TRANSMISSION DEVICE, WIRELESS TRANSMISSION METHOD, WIRELESS COMMUNICATION SYSTEM, AND PROGRAM

(75) Inventors: Masahiko Naito, Tokyo (JP); Katsutoshi Itoh, Tokyo (JP)

(73) Assignee: Sony Corporation, Tokyo (JP)

(*) Notice: Subject to any disclaimer, the term of this patent is extended or adjusted under 35 U.S.C. 154(b) by 657 days.

(21) Appl. No.: 12/235,431

(22) Filed: Sep. 22, 2008

(65) Prior Publication Data

US 2009/0086696 A1  Apr. 2, 2009

(30) Foreign Application Priority Data

Sep. 28, 2007 (JP) .............................. P2007-255156

(51) Int. Cl.
*H04W 4/00* (2009.01)
(52) U.S. Cl. ................... 370/338; 370/252; 455/522
(58) Field of Classification Search .................. 370/252, 370/253, 401, 437, 338, 347; 455/522, 452, 455/453, 436, 504
See application file for complete search history.

(56) References Cited

U.S. PATENT DOCUMENTS

| | | | |
|---|---|---|---|
| 7,502,330 B2* | 3/2009 | Nabetani et al. | 370/252 |
| 7,852,791 B2* | 12/2010 | Nakajima et al. | 370/282 |
| 2005/0163058 A1 | 7/2005 | Nabetani et al. | |
| 2006/0083233 A1* | 4/2006 | Nishibayashi et al. | 370/389 |
| 2007/0153760 A1* | 7/2007 | Shapira | 370/350 |

FOREIGN PATENT DOCUMENTS

| | | |
|---|---|---|
| JP | 2005-210618 | 8/2005 |
| JP | 2006-203266 | 8/2006 |
| JP | 2006-287522 | 10/2006 |

* cited by examiner

*Primary Examiner* — Gary Mui
(74) *Attorney, Agent, or Firm* — Finnegan, Henderson, Farabow, Garrett & Dunner, L.L.P.

(57) ABSTRACT

A wireless transmission device according to the present invention includes a packet transmission portion, a Block ACK receiving portion, a retransmission control portion, and a transmission rate revision portion. The packet transmission portion transmits a plurality of packets to a receiving terminal. The Block ACK receiving portion receives a Block ACK that is received from the receiving terminal after the plurality of the packets are transmitted. The retransmission control portion determines a plurality of the packets to be consecutively transmitted, based on the Block ACK. The transmission rate revision portion revises a transmission rate that is used when the plurality of the packets are consecutively transmitted from a value that is normally used in accordance with a wireless channel quality.

13 Claims, 15 Drawing Sheets

FIG.4

Table A-1 - Rate dependent parameters for mandatory 20 MHz, $N_{SS}=1$ ($N_{ES}=1$) modes

| MCS Index | Modulation | R | $N_{BPSC}$ | $N_{SD}$ | $N_{SP}$ | $N_{CBPS}$ | $N_{DBPS}$ | Data rate (Mbps) 800ns GI | Data rate (Mbps) 400ns GI |
|---|---|---|---|---|---|---|---|---|---|
| 0 | BPSK | 1/2 | 1 | 52 | 4 | 52 | 26 | 6.5 | 7.2 |
| 1 | QPSK | 1/2 | 2 | 52 | 4 | 104 | 52 | 13.0 | 14.4 |
| 2 | QPSK | 3/4 | 2 | 52 | 4 | 104 | 78 | 19.5 | 21.7 |
| 3 | 16-QAM | 1/2 | 4 | 52 | 4 | 208 | 104 | 26.0 | 28.9 |
| 4 | 16-QAM | 3/4 | 4 | 52 | 4 | 208 | 156 | 39.0 | 43.3 |
| 5 | 64-QAM | 2/3 | 6 | 52 | 4 | 312 | 208 | 52.0 | 57.8 |
| 6 | 64-QAM | 3/4 | 6 | 52 | 4 | 312 | 234 | 58.5 | 65.0 |
| 7 | 64-QAM | 5/6 | 6 | 52 | 4 | 312 | 260 | 65.0 | 72.2 |

Table A-2 - Rate dependent parameters for mandatory 20 MHz, $N_{SS}=2$ ($N_{ES}=1$) modes

| MCS Index | Modulation | R | $N_{BPSC}$ | $N_{SD}$ | $N_{SP}$ | $N_{CBPS}$ | $N_{DBPS}$ | Data rate (Mbps) 800ns GI | Data rate (Mbps) 400ns GI |
|---|---|---|---|---|---|---|---|---|---|
| 8 | BPSK | 1/2 | 1 | 52 | 4 | 104 | 52 | 13.0 | 14.444 |
| 9 | QPSK | 1/2 | 2 | 52 | 4 | 208 | 104 | 26.0 | 28.889 |
| 10 | QPSK | 3/4 | 2 | 52 | 4 | 208 | 156 | 39.0 | 43.333 |
| 11 | 16-QAM | 1/2 | 4 | 52 | 4 | 416 | 208 | 52.0 | 57.778 |
| 12 | 16-QAM | 3/4 | 4 | 52 | 4 | 416 | 312 | 78.0 | 86.667 |
| 13 | 64-QAM | 2/3 | 6 | 52 | 4 | 624 | 416 | 104.0 | 115.556 |
| 14 | 64-QAM | 3/4 | 6 | 52 | 4 | 624 | 468 | 117.0 | 130.000 |
| 15 | 64-QAM | 5/6 | 6 | 52 | 4 | 624 | 520 | 130.0 | 144.444 |

FIG.5

Table 135 -Modulation-dependent parameters

| Modulation | Coding rate (R) | Coded bits per subcarrier ($N_{BPSC}$) | Coded bits per OFDM symbol ($N_{CBPS}$) | Data bits per OFDM symbol ($N_{DBPS}$) | Data rate (Mb/s) (20 MHz channel spacing) | Data rate (Mb/s) (10 MHz channel spacing) | Data rate (Mb/s) (5 MHz channel spacing) |
|---|---|---|---|---|---|---|---|
| BPSK | 1/2 | 1 | 48 | 24 | 6 | 3 | 1.5 |
| BPSK | 3/4 | 1 | 48 | 36 | 9 | 4.5 | 2.25 |
| QPSK | 1/2 | 2 | 96 | 48 | 12 | 6 | 3 |
| QPSK | 3/4 | 2 | 96 | 72 | 18 | 9 | 4.5 |
| 16-QAM | 1/2 | 4 | 192 | 96 | 24 | 12 | 6 |
| 16-QAM | 3/4 | 4 | 192 | 144 | 36 | 18 | 9 |
| 64-QAM | 2/3 | 6 | 288 | 192 | 48 | 24 | 12 |
| 64-QAM | 3/4 | 6 | 288 | 216 | 54 | 27 | 13.5 |

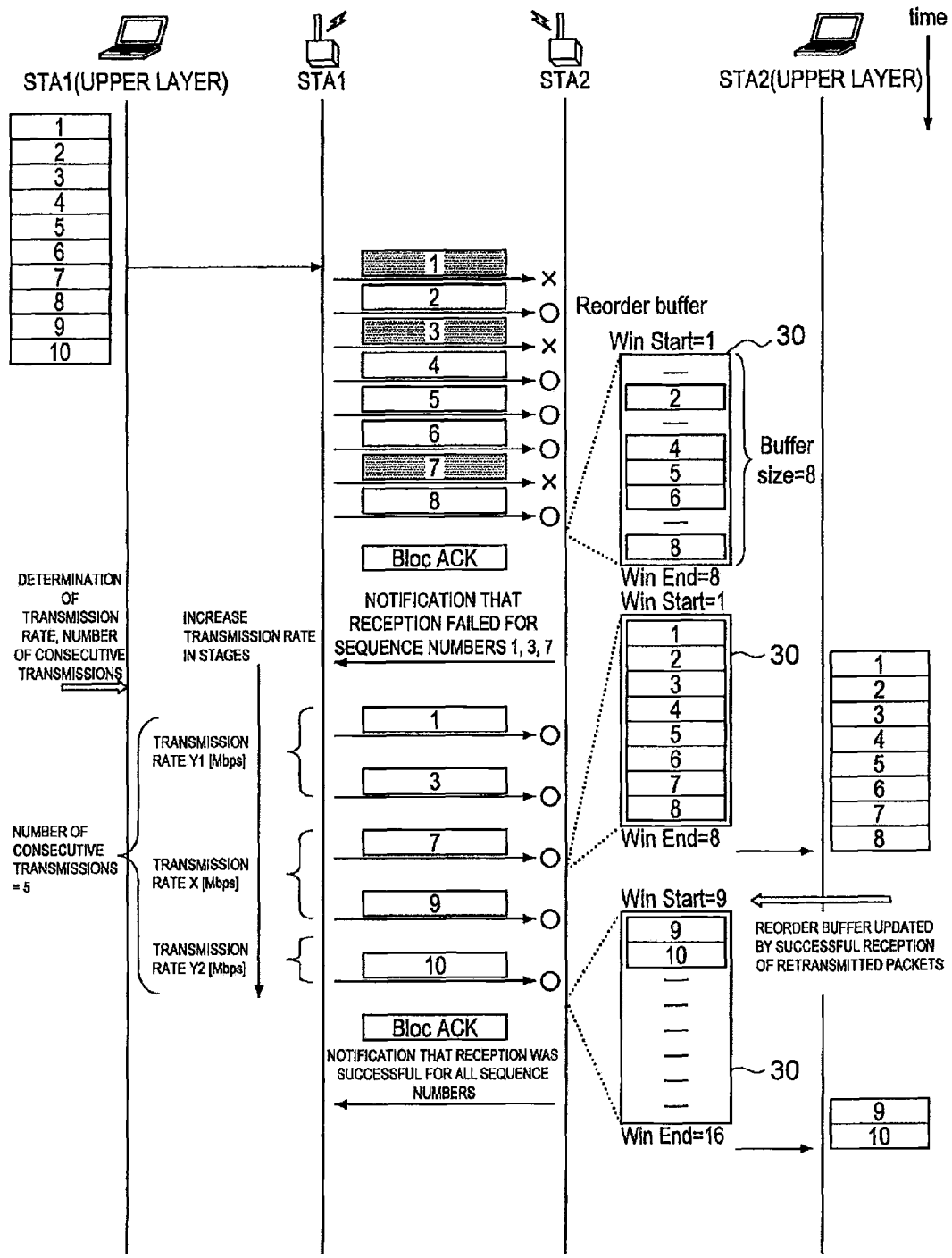

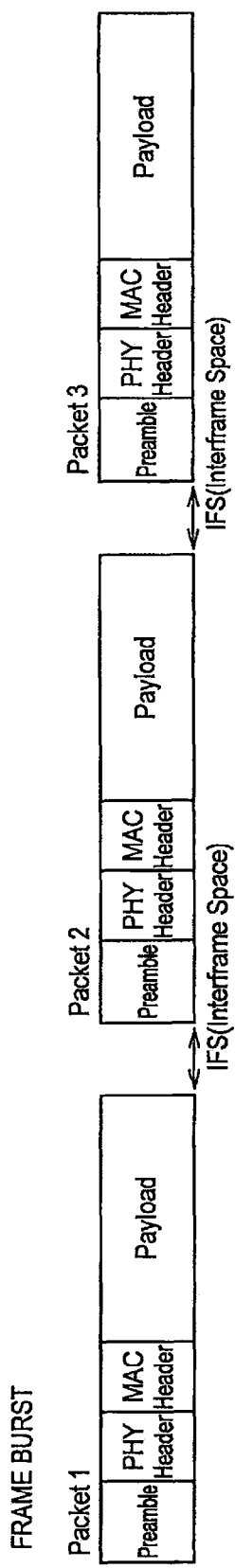
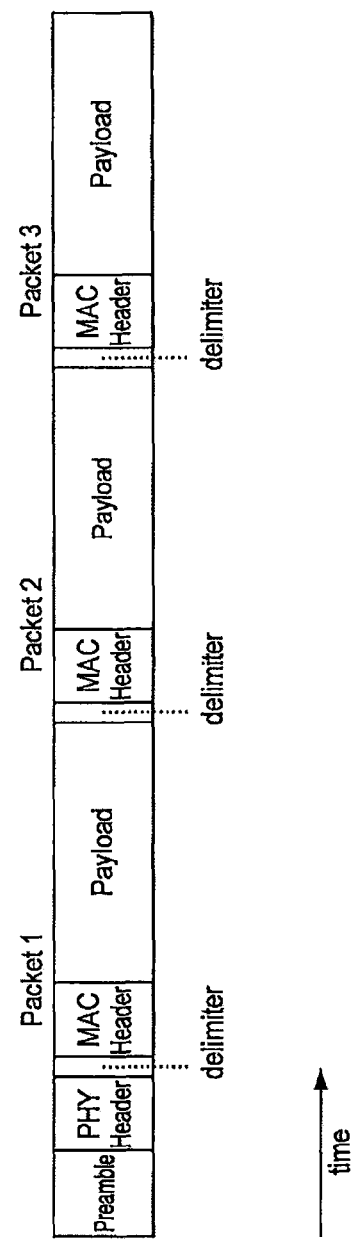

WIRELESS TRANSMISSION DEVICE, WIRELESS TRANSMISSION METHOD, WIRELESS COMMUNICATION SYSTEM, AND PROGRAM

CROSS REFERENCES TO RELATED APPLICATIONS

The present invention contains subject matter related to Japanese Patent Application JP 2007-255156 filed in the Japan Patent Office on Sep. 28, 2007, the entire contents of which being incorporated herein by reference.

BACKGROUND OF THE INVENTION

1. Field of the Invention

The present invention relates to a wireless transmission device, a wireless transmission method, a wireless communication system, and a program.

2. Description of the Related Art

In recent years, wireless networks, typified by those based on the IEEE 802.11 protocol, are coming into wider use as alternatives to wired networks, because of advantages such as the greater degree of freedom of the devices and the like. The many and varied applications that are used in these wireless networks have created a need for higher transmission rates.

It is in this context that the Block ACK mechanism illustrated in FIG. 11 has been provided in the Medium Access Control (MAC) layer prescribed by the IEEE 802.11e and IEEE 802.11n (draft) protocols. As shown in FIG. 11, eight packets to which sequence numbers 1 to 8 are assigned are transmitted consecutively from a wireless terminal STA1 to a wireless terminal STA2. After the packets are transmitted consecutively, STA1 receives an ACK (a Block ACK) for the plurality of the packets. The Block ACK contains information on the sequence numbers of the packets that were successfully received and the sequence numbers of the packets for which reception failed. As shown in FIG. 11, the Block ACK contains the sequence number of the packet with which the reception started (Start Sequence Number=1) and a bitmap of ones and zeroes that respectively indicate whether reception succeeded or failed.

FIG. 12, on the other hand, shows a case in which one ACK is received per packet. According to the method shown in FIG. 11, the Block ACK is received after the packets are transmitted consecutively, in contrast to the case shown in FIG. 12, in which the ACK is received for each individual packet. This makes it possible to reduce the overhead of transmitting the ACKs and increases the total throughput.

On the other hand, in the IEEE 802.11 protocol, the order in which the packets arrive is ensured in relation to the upper layer, and the received packets are presented to the upper layer only when the order of arrival is correct. Therefore, in a case where the Block ACK is used, the receiving side must have a buffer called a reorder buffer. FIG. 13 shows a system that uses a reorder buffer. Each of the wireless terminals STA1, STA2 has a reorder buffer 200 of limited size. The buffer size is known to both the transmitting terminal STA1 and the receiving terminal STA2 through negotiation between the terminals before the start of the consecutive transmission procedure that uses the Block ACK. As described above, a sequence number is assigned to each packet, as prescribed by the IEEE 802.11 protocol. In the example in FIG. 13, the packets with the sequence numbers 1 to 10 are transmitted from STA1 to STA2. When an error occurs during the consecutive transmission of the packets, the reorder buffer 200 of STA2 temporarily holds the packets with the sequence numbers that follow the packet for which the error occurred. Further, numbers are set in advance for a buffer window starting point (Win_Start) and a window ending point (Win_End). The packets with the sequence numbers in the range from the Win_Start number to the Win_End number can be held in the reorder buffer 200. In this case, Win_Start corresponds to the lowest sequence number among the packets that are not successfully received. The value of Win_End is calculated by adding the value of Win_Start and the number of packets that can be held in the reorder buffer 200 (the buffer size). In this example, the buffer size of the reorder buffer 200 is 8.

In the example in FIG. 13, when the packets were transmitted from STA1, the reception on the STA2 side failed for the packets with the sequence numbers 1, 3, and 7. The packets that were successfully received, with the sequence numbers 2, 4 to 6, and 8, are held in the reorder buffer 200 of STA2. Having received the Block ACK from STA2 after the consecutive transmission and having recognized the packet errors, STA1 retransmits the packets 1, 3, and 7 for which the errors occurred. Having received the retransmission of the packets, STA2 takes the packets that are held in the reorder buffer 200 and sends them to the upper layer in consecutive sequence number order, starting with the lowest sequence number.

In the example in FIG. 13, in the retransmission of the packets 1, 3, and 7, the packets 1 and 7 are successfully received. The reorder buffer 200 is holding the consecutive packets 1 and 2, so the packets 1 and 2 are sent to the upper layer. On the other hand, the reception of the packet 3 was not successful, so the packet 3 and the subsequent packets are not sent to the upper layer. Because the reception of the packet 3 was not successful, the value of Win_Start is set to 3, and the value of Win_End is set to 10. After the retransmission of the packets, STA1, having recognized the reception error for the packet 3 based on the Block ACK, retransmits the packet 3. In addition, based on the value of 10 for Win_End, STA1 recognizes that the reorder buffer 200 can hold up to ten packets, so along with the packet 3, STA1 consecutively transmits the packets 9 and 10. If the transmission of the packets 3, 9, and 10 is successful, packets with consecutive sequence numbers, from the packet 3 to the packet 10, are held in the reorder buffer 200, so STA2 sends the packets 3 to 10 to the upper layer. Therefore, according to the procedure shown in FIG. 13, the packets with the consecutive sequence numbers that are held in the reorder buffer 200 are sent to the upper layer, so it is possible to ensure the order in which the packets arrive at the upper layer.

[Patent document 1] Japanese Unexamined Patent Application Publication No. 2005-210618

[Patent document 2] Japanese Unexamined Patent Application Publication No. 2006-203266

[Patent document 3] Japanese Unexamined Patent Application Publication No. 2006-287522

SUMMARY OF THE INVENTION

By increasing the number of packets that are consecutively transmitted, a procedure like that shown in FIG. 13 can reduce the overhead of transmitting and receiving the ACKs, which increases the throughput. However, because there is a limit on the number of packets that can be held in the reorder buffer 200, increasing the number of consecutive transmissions creates new risks. For example, in a case where a packet is received that has a sequence number greater than the value of Win_End, the IEEE 802.11n (draft) protocol prescribes that a packet with a sequence number that is less than Win_Start is to be discarded, even if it is received as a result of a retransmission. Therefore, if the number of consecutively transmitted packets is increased, cases will occur in which not all of the packets can be received, and packets with non-consecutive sequence numbers are sent to the upper layer.

This problem will be explained in detail below based on FIG. 14. In the example in FIG. 13, STA1, having recognized the errors for packets 1, 3, and 7 based on the Block ACK, retransmits the three packets 1, 3, and 7 for which the errors occurred. However, in the example in FIG. 14, because the consecutive transmission is performed, the packets 9 and 10 are transmitted when the packets 1, 3, and 7 are retransmitted, such that the five packets are transmitted consecutively. After the consecutive transmission of the packets 1 to 8, the errors occurred for the packets 1, 3, and 7, in the same manner as in FIG. 13, so Win_Start was set to 1, and Win_End was set to 8. When the packets 1, 3, 7, 9, and 10 are transmitted consecutively by the second consecutive transmission, the sequence numbers for the packet 9 and the packet 10 exceed the value of Win_End, so the packets 9 and 10 are added to the reorder buffer 200. This causes the window of the reorder buffer 200 to be advanced such that the value of Win_End is set to 10, and the value of Win_Start is set to 3.

When the value of Win_Start is set to 3. The packets with the sequence numbers that are less than the value of Win_Start (the packets 1 and 2) are sent to the upper layer, but because the reception of the packet 1 was not successful, the transfer to the upper layer is done without the packet 1. A gap in the received packets thus occurs in the upper layer. Then any packets that are subsequently received with sequence numbers that are less than the value of Win_Start are discarded.

When the received packets are discarded in this manner, various problems can occur. For example, the gap in the received packets may be recognized in the upper layer, so the upper layer performs retransmission control, causing the throughput to drop. If the packets are passed along to an upper layer application without the missing packets, the communication quality will deteriorate. Thus, increasing the number of the consecutive transmissions creates the problems of the gaps in the received packets, the packets that are not received, and the discarding of the packets.

In order to avoid these sorts of problems and to eliminate the risk of the missing packets, when the number of the consecutively transmitted packets is determined on the transmitting side, the number of the consecutive transmissions can be restricted such that a packet with a sequence number that is greater than the value of the window ending point (Win_End) of the reorder buffer 200 on the receiving side is not transmitted, as shown in FIG. 15. In the example in FIG. 15, the fact that the value of Win_End is 8 is taken into account when the second consecutive transmission is done, such that only the packets with the sequence numbers 1, 3, and 7, which are not greater than the value (8) of Win_End, are transmitted consecutively. Thus, limiting the number of the consecutively transmitted packets makes it possible to avoid the situation in which a sequence number of a transmitted packet is greater than the value of Win_End. This in turn makes it possible to avoid the occurrence of the gaps in the received packets in the upper layer.

However, limiting the number of the consecutively transmitted packets as shown in FIG. 15 reduces the number of the packets that are consecutively transmitted, making it impossible to ensure the same transmission rate as in FIG. 13 and diminishing the advantage of the improved throughput that is achieved by using the Block ACK.

Accordingly, the present invention addresses the problems described above and provides a wireless transmission device, a wireless transmission method, a wireless communication system, and a program that are new and improved and that are capable of reducing the occurrence of the packet reception errors that are caused by increasing the number of consecutive transmissions.

According to an embodiment of the present invention, there is provided a wireless transmission device that includes a packet transmission portion, a reply data receiving portion, a transmission packet determination portion, and a transmission conditions revision portion. The packet transmission portion transmits a plurality of packets to a receiving terminal. The reply data receiving portion receives reply data that is received from the receiving terminal after the plurality of the packets are transmitted. The transmission packet determination portion determines a plurality of the packets to be consecutively transmitted, based on the reply data. The transmission conditions revision portion revises at least one of a transmission rate and a transmission power that are used when the plurality of the packets are consecutively transmitted from a value that is normally used in accordance with a wireless channel quality.

In this configuration, the reply data is received from the receiving terminal after the plurality of the packets are transmitted. Then a plurality of the packets to be consecutively transmitted are determined based on the reply data. At least one of a transmission rate and a transmission power that are used in the consecutive transmission is revised from the value that is normally used in accordance with the wireless channel quality. It therefore becomes possible to reduce the occurrence of transmission errors during the consecutive transmission and to reliably decrease the probability that a gap will occur in the packets that are received by the upper layer of the receiving terminal.

The revision of the transmission rate may also include at least one of a change of a modulation method, a change of a redundancy of an error correcting code, and a change of a MIMO communication spatial multiplexing parameter. This configuration makes it possible to revise the transmission rate by changing the modulation method, changing the redundancy of an error correcting code, or changing the MIMO communication spatial multiplexing parameter.

The revision of the transmission rate may also be performed with priority given to changing the modulation method. In this configuration, the changing of the modulation method tends to influence the change in the transmission rate more strongly than does another method, such as the changing of the redundancy of the error correcting code, so it produces a greater effect on the change in the transmission rate.

The wireless transmission device may also include a transmission rate control portion that determines the transmission rate in accordance with the wireless channel quality. The transmission conditions revision portion may also set the transmission rate during at least a portion of the time that the plurality of the packets are consecutively transmitted to a lower value than the transmission rate that is determined by the transmission rate control portion. In this configuration, during at least a portion of the time that the consecutive transmission is being performed, the transmission rate is set to a lower value than the transmission rate that is determined in accordance with the wireless channel quality. This makes it possible to reduce the occurrence of transmission errors during the consecutive transmission, as well as to improve the throughput during the transmission.

The consecutively transmitted packets may also include at least one retransmitted packet and at least one newly transmitted packet. The transmission conditions revision portion may also set the transmission rate during the transmission of the at least one retransmitted packet to a lower value than the transmission rate that is determined by the transmission rate control portion. In this configuration, the transmission rate during the transmission of the retransmitted packet is set to a lower value than the transmission rate that is determined by the transmission rate control portion. This makes it possible to reliably reduce the occurrence of transmission errors for the retransmitted packet during the consecutive transmission.

The transmission conditions revision portion may also set the transmission rate during the transmission of the at least one newly transmitted packet to one of the same value as the transmission rate that is determined by the transmission rate control portion and a higher value than the transmission rate that is determined by the transmission rate control portion. In this configuration, the transmission rate during the transmission of the newly transmitted packet is set to one of the same value as the transmission rate that is determined by the transmission rate control portion and a higher value than the transmission rate that is determined by the transmission rate control portion. This makes it possible to reduce the occurrence of transmission errors for the retransmitted packet, as well as to improve the communication throughput.

The transmission conditions revision portion, at the start of the consecutive transmission, may also set the transmission rate to a lower value than the transmission rate that is determined by the transmission rate control portion and, after the start of the consecutive transmission, may increase the transmission rate according to the number of the transmitted packets. In this configuration, the transmission rate is set to a lower value at the start of the consecutive transmission than the transmission rate that is determined by the transmission rate control portion. After the start of the consecutive transmission, the transmission rate is increased according to the number of the transmitted packets. This makes it possible to reduce the occurrence of transmission errors, particularly at the start of the consecutive transmission, as well as to improve the communication throughput after the start of the consecutive transmission.

The wireless transmission device may also include an end point number acquisition portion that, based on the reply data, acquires an end point number for the packets that can be held in a data buffer of the receiving terminal. In a case where a sequence number for a packet that has been set for the consecutive transmission exceeds the end point number, the transmission conditions revision portion may also revise at least one of the transmission rate and the transmission power that are used when the plurality of the packets are consecutively transmitted. This configuration makes it possible to reduce the occurrence of transmission errors during the consecutive transmission and to reliably decrease the probability that a gap will occur in the packets that are received by the upper layer of the receiving terminal, even in a case where a sequence number for a packet that has been set for the consecutive transmission exceeds the end point number.

The wireless transmission device may also include a consecutive transmission control portion that controls the number of the packets that are consecutively transmitted in order to transmit the consecutively transmitted packets using a frame aggregation. The transmission conditions revision portion may also set the transmission rate during at least a portion of the time that the plurality of the packets are consecutively transmitted using the frame aggregation to a lower value than the value that is normally used. In a case where the packets are consecutively transmitted using the frame aggregation, this configuration makes it possible to reduce the occurrence of transmission errors during the consecutive transmission and to reliably decrease the probability that a gap will occur in the packets that are received by the upper layer of the receiving terminal.

The transmission conditions revision portion may also change the transmission rate for a plurality of the frame aggregations that are transmitted during the consecutive transmission. In a case where the packets are consecutively transmitted using the frame aggregation, this configuration makes it possible to change the transmission rate to an optimal value. This makes it possible to reduce the occurrence of transmission errors during the consecutive transmission, as well as to improve the communication throughput.

The transmission conditions revision portion may also increase the transmission power during the consecutive transmission to a higher value than the value that is normally used. In this configuration, the transmission power during the consecutive transmission is increased to a higher value than the value that is normally used. This makes it possible to reduce the occurrence of transmission errors during the consecutive transmission.

According to another embodiment of the present invention, there is provided a wireless transmission method. The wireless transmission method includes a step of transmitting a plurality of packets to a receiving terminal. The wireless transmission method also includes a step of receiving reply data that is received from the receiving terminal after the plurality of the packets are transmitted. The wireless transmission method also includes a step of determining a plurality of the packets to be consecutively transmitted, based on the reply data. The wireless transmission method also includes a step of revising at least one of a transmission rate and a transmission power that are used when the plurality of the packets are consecutively transmitted from a value that is normally used in accordance with a wireless channel quality.

With this method, the reply data is received from the receiving terminal after the plurality of the packets are transmitted. Then a plurality of the packets to be consecutively transmitted are determined based on the reply data. At least one of a transmission rate and a transmission power that are used in the consecutive transmission is revised from the value that is normally used in accordance with the wireless channel quality. It therefore becomes possible to reduce the occurrence of transmission errors during the consecutive transmission and to reliably decrease the probability that a gap will occur in the packets that are received by the upper layer of the receiving terminal.

According to another embodiment of the present invention, there is provided a wireless communication system that includes a transmission device and a reception device that are connected through a wireless communication network. The wireless transmission device that includes a packet transmission portion, a reply data receiving portion, a transmission packet determination portion, and a transmission conditions revision portion. The packet transmission portion transmits a plurality of packets to a receiving terminal. The reply data receiving portion receives reply data that is received from the receiving terminal after the plurality of the packets are transmitted. The transmission packet determination portion determines a plurality of the packets to be consecutively transmitted, based on the reply data. The transmission conditions revision portion revises at least one of a transmission rate and a transmission power that are used when the plurality of the packets are consecutively transmitted from a value that is normally used in accordance with a wireless channel quality.

In this configuration, the reply data is received from the receiving terminal after the plurality of the packets are transmitted. Then a plurality of the packets to be consecutively transmitted are determined based on the reply data. At least one of a transmission rate and a transmission power that are used in the consecutive transmission is revised from the value that is normally used in accordance with the wireless channel quality. It therefore becomes possible to reduce the occurrence of transmission errors during the consecutive transmission and to reliably decrease the probability that a gap will occur in the packets that are received by the upper layer of the receiving terminal.

According to another embodiment of the present invention, there is provided a computer program that causes a computer to function as a portion that transmits a plurality of packets to a receiving terminal. The program also causes the computer to function as a portion that receives reply data that is received from the receiving terminal after the plurality of the packets are transmitted. The program also causes the computer to function as a portion that determines a plurality of the packets to be consecutively transmitted, based on the reply data. The program also causes the computer to function as a portion that revises at least one of a transmission rate and a transmission power that are used when the plurality of the packets are consecutively transmitted from a value that is normally used in accordance with a wireless channel quality.

With this program, the reply data is received from the receiving terminal after the plurality of the packets are transmitted. Then a plurality of the packets to be consecutively transmitted are determined based on the reply data. At least one of a transmission rate and a transmission power that are used in the consecutive transmission is revised from the value that is normally used in accordance with the wireless channel quality. It therefore becomes possible to reduce the occurrence of transmission errors during the consecutive transmission and to reliably decrease the probability that a gap will occur in the packets that are received by the upper layer of the receiving terminal.

According to the present invention, the occurrence of packet reception errors can be reduced and the communication throughput can be improved by increasing the number of the consecutive transmissions.

BRIEF DESCRIPTION OF THE DRAWINGS

FIG. 4 is a figure that shows an example of a specification that prescribes modulation methods, coding rates, spatial multiplexing parameters, and transmission rates in the IEEE 802.11n protocol;

FIG. 5 is a figure that shows an example of a specification that prescribes modulation methods, coding rates, and transmission rates in the IEEE 802.11a protocol;

FIG. 7 is a figure that shows an example of an operation of the transmission device according to a third embodiment;

FIGS. 8A and 8B are figures that show a frame burst versus a frame aggregation;

DETAILED DESCRIPTION OF THE PREFERRED EMBODIMENTS

Figure 1:
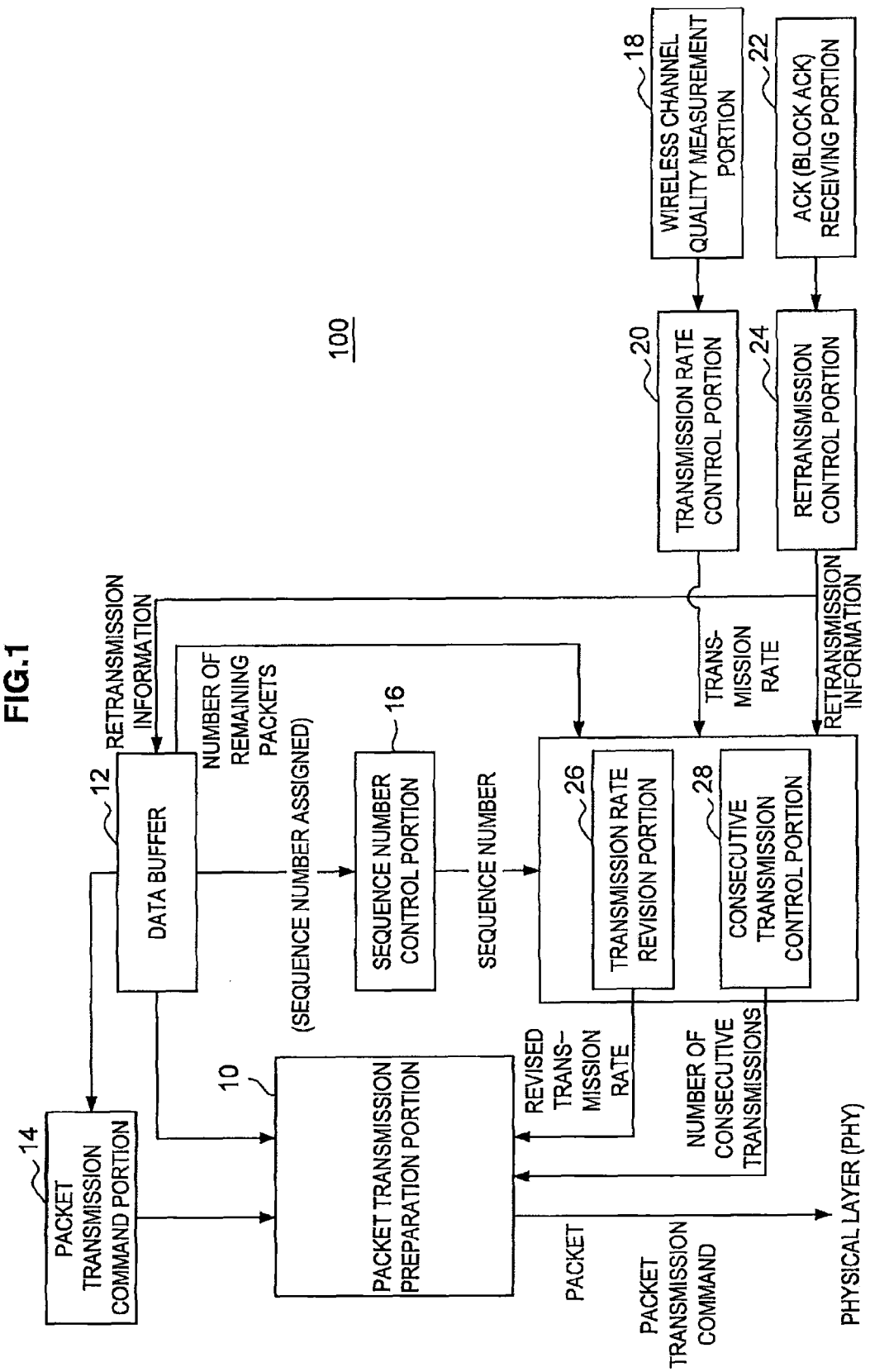
FIG. 1 is a block diagram that shows a configuration of a transmission device according to embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

FIG. 1 is a block diagram that shows a configuration of a transmission device 100 according to the embodiments of the present invention. More specifically, FIG. 1 shows a configuration of a MAC layer of the transmission device 100. As shown in FIG. 1, the transmission device 1000 includes a packet transmission preparation portion (a packet transmission portion) 10, a data buffer 12, a packet transmission command portion 14, a sequence number control portion 16, a wireless channel quality measurement portion 18, a transmission rate control portion 20, an ACK (a Block ACK) receiving portion 22, a retransmission control portion (a transmission packet determination portion) 24, a transmission rate revision portion (a transmission conditions revision portion) 26, and a consecutive transmission control portion 28.

In the configuration in FIG. 1, data for packets that the transmission device 100 attempts to transmit are accumulated in the data buffer 12. In a case where the data for the packets are accumulated in the data buffer 12, the packet transmission command portion 14 issues a command to transmit the data that are accumulated in the data buffer 12 to the packet transmission preparation portion 10. The sequence number control portion 16 performs processing that assigns sequence numbers to the packet data that are held in the data buffer 12. Information on the sequence numbers is also sent to the transmission rate revision portion 26.

The packet transmission preparation portion 10 receives the command from the packet transmission command portion 14, creates the packets from the data that are held in the data buffer 12, and sends the packet data to a physical layer (PHY) along with the sequence numbers for the packets and a command to the physical layer. At the physical layer, the packets that were sent from the packet transmission preparation portion 10 are transmitted to a receiving terminal.

The wireless channel quality measurement portion 18 is a functional block that measures a wireless channel quality. It uses a technique such as pattern matching or the like to infer the state of reception of a received signal based on the SN ratio. The transmission rate control portion 20 determines a transmission rate based on the wireless channel quality that is measured by the wireless channel quality measurement portion 18.

Figure 2:
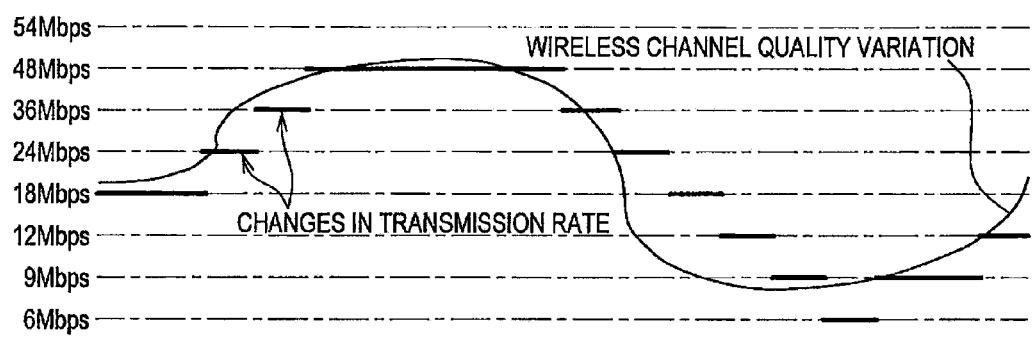
FIG. 2 is a figure that shows a state in which a transmission rate (a transfer rate) varies according to a wireless channel quality.

FIG. 2 is a figure that shows a state in which the transmission rate (a transfer rate) varies according to the wireless channel quality. Note that the better the wireless channel quality is, the higher the transmission rate is set.

The ACK (Block ACK) receiving portion 22 receives the Block ACK, and the retransmission control portion 24 performs processing that determines the packets to retransmit, based on the Block ACK. Based on the Block ACK, the retransmission control portion 24 performs processing that deletes from the data buffer 12 the packets for which reception was successful and leaves in the data buffer 12 information on the packets for which reception failed.

The transmission rate revision portion 26 performs processing that revises the transmission rate that was determined by the transmission rate control portion 20. In each of the embodiments, the transmission rate revision portion 26 performs processing that makes the transmission rate during retransmission lower than the normal transmission rate. The consecutive transmission control portion 28 controls the number of the packets that are consecutively transmitted.

Figure 3:
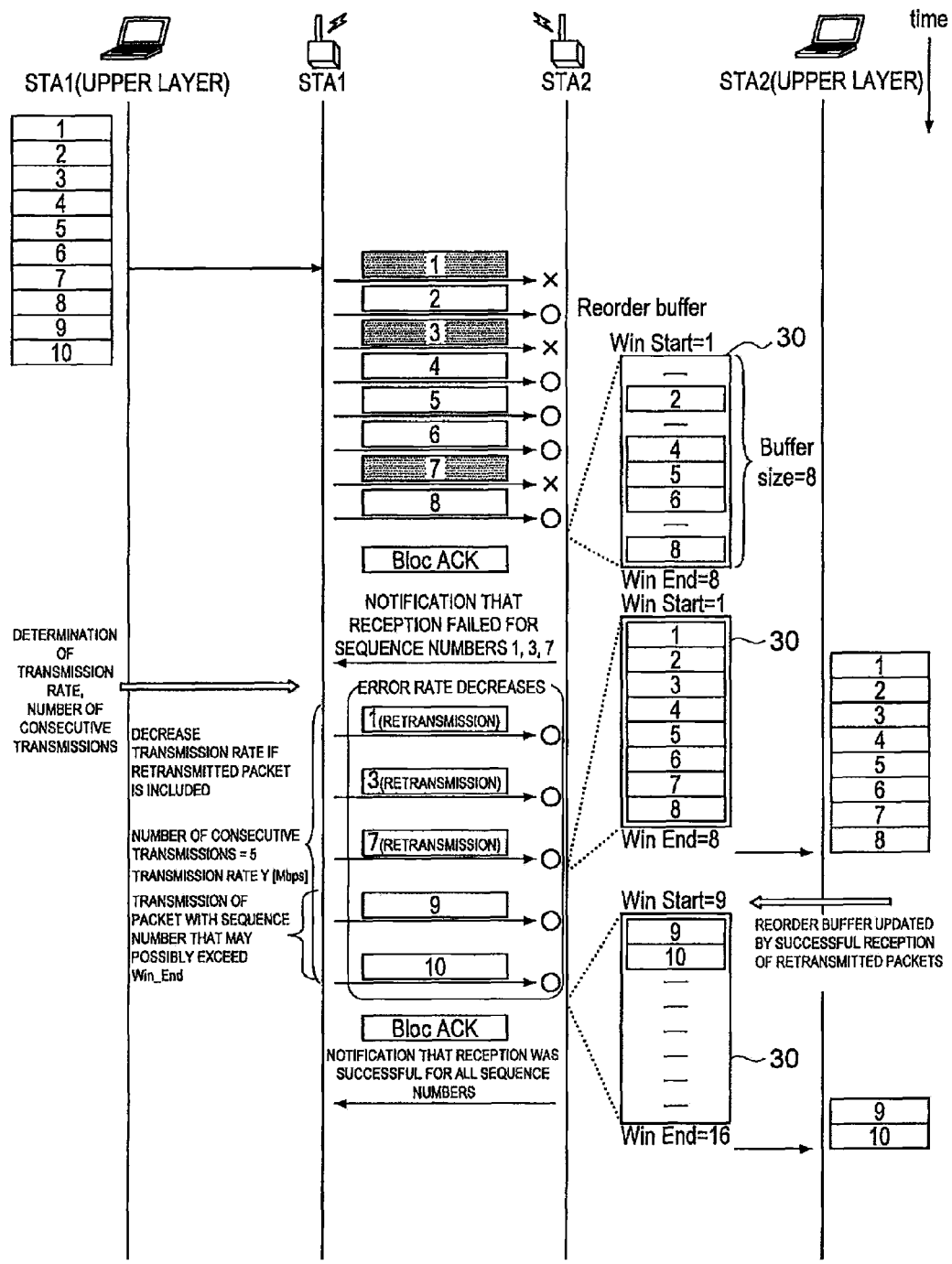
FIG. 3 is a figure that shows an example of an operation that determines a number of consecutive transmissions and a transmission rate according to a first embodiment.

FIG. 3 is a figure that shows an example of an operation that determines a number of consecutive transmissions and the transmission rate, according to the first embodiment. A transmitting terminal STA1 corresponds to the transmission device 100 according to the present embodiment. FIG. 3 shows an operation that transmits ten individual packets 1 to 10 from the transmitting terminal STA1 to a receiving terminal STA2. First, STA1 consecutively transmits to the receiving terminal STA2 the packets 1 to 8 with the sequence numbers 1 to 8. After the consecutive transmission, STA1 receives the Block ACK from STA2, thus acquiring information on a state of a reorder buffer 30 of the receiving terminal STA2. This processing is performed by the ACK receiving portion 22 in FIG. 1. The retransmission control portion 24 deletes from the data buffer 12 the data for the packets that were successfully received.

STA1 determines the transmission rate to be used when the retransmission of the data starts, as well as the number of consecutive transmissions, as described below. At this point in time, five packets (the packets 1, 3, 7, 9, and 10) reside in the data buffer 12, including the packets to be retransmitted. The number of the packets to be consecutively transmitted is therefore set to five. In this processing, the consecutive transmission control portion 28 determines the number of the packets to be consecutively transmitted by acquiring the number of the packets remaining that will be transmitted from the data buffer 12 in FIG. 1.

Based on the Block ACK, the retransmission control portion 24 of STA1 infers a value of Win_End for the reorder buffer 30 of STA2. (Win_End is described in detail in the Description of the Related Art.) In this case, the size of the reorder buffer 30 of STA2 is acquired by negotiation prior to the start of the Block ACK sequence. The number of the packets for which reception failed is also known by the receiving of the Block ACK. Therefore, the value of a communication partner's Win_End can be inferred from cumulative totals of the packets in the Block ACKs that have arrived up to this point in time and from the size of the reorder buffer 30. Based on the fact that the value of Win_End is 8 and the highest sequence number among the five packets that will be consecutively transmitted is 10 (for the packet 10), the retransmission control portion 24 recognizes the possibility that the consecutive transmission of the five packets will exceed the value of Win_End for the reorder buffer 30 of STA2. In other words, the retransmission control portion 24 functions as a block that acquires an end point number for the reorder buffer 30. Because there is the possibility that the consecutive transmission of the five packets will exceed the value of Win_End for the reorder buffer 30, the transmission rate revision portion 26 sets the transmission rate for the five packets 1, 3, 7, 9, and 10 lower than the normal transmission rate in order to reduce the error rate.

In this case, if X Mbps is the transmission rate that is determined by the transmission rate control portion 20, and Y Mbps is the transmission rate when the packets 1, 3, 7, 9, and 10 are transmitted, then X is greater than Y.

The probability of successful transmissions thus increases for all of the packets when the packets are retransmitted. Accordingly, once the retransmitted packets are successfully received on the STA2 side, the packets in the reorder buffer 30 are sent to the upper layer. As shown in FIG. 3, lowering the transmission rate means that all of the retransmitted packets 1, 3, 7, 9 and 10, are successfully received, and the packets 1 to 8 are held in the reorder buffer 30. Then, while the packets 9 and 10 are being received, the packets 1 to 8 are sent to the upper layer, and the state of the reorder buffer 30 is updated.

When the state of the reorder buffer 30 is updated, the value of Win_Start becomes 9, and the value of Win_End becomes 16. (Win_Start is described in detail in the Description of the Related Art.) Therefore, in the case where the consecutive transmission of the five packets 1, 3, 7, 9, and 10 is performed, the highest sequence number is 10, so the reception of a packet with a sequence number that is greater than Win_End (16) does not occur on the STA2 side. Therefore, when the packets 9 and 10 are received, they are held in the updated reorder buffer 30 and are sent to the upper layer. It thus becomes possible to reliably decrease the probability that a gap will occur in the packets that are received by the upper layer.

Note that a program that implements in the transmission device 100 the functional blocks shown in FIG. 1 and the processing shown in FIG. 3 can be stored in a storage portion such as a memory or the like that is provided within the transmission device 100 and can be stored in a magnetic disk or the like that is provided outside the transmission device 100.

The changing of the transmission rate during the packet transmission can be accomplished by changing a modulation method that is used, by changing a redundancy of an error correcting code that is included in the packets, and by changing a MIMO spatial multiplexing parameter (a number of spatial streams). The transmission rate can be lowered by changing any one of the modulation method, the coding rate, and the multiplexing parameter. The transmission rate may also be changed by changing a combination of the modulation method, the coding rate, and the multiplexing parameter. Note that changing the modulation method tends to influence the change in the transmission rate more strongly than does changing the coding rate, so it produces a greater effect on the change in the transmission rate.

FIG. 4 shows an example of a specification that prescribes the modulation methods, the coding rates, the spatial multiplexing parameters, and the transmission rates in the IEEE 802.11n protocol. This specification has been publicly released by the EWC, which is an industry group that is promoting the formulation of IEEE 802.11n specifications. In FIG. 4, the "Modulation" column indicates the modulation method. The "R" column indicates the coding rate, which is calculated by the following formula:

$$R = \text{User data/Transmission data}$$

The smaller the value of R is, the smaller the ratio of the user data is, and the greater the coding rate becomes, so while the transmission is more resistant to errors, the communication speed becomes slower. Therefore, the smaller the value of R is, the slower the transmission rate becomes.

As shown in FIG. 4, the transmission rate becomes slower as the modulation method is changed from 64-QAM to 16-QAM to QPSK to BPSK. Moreover, even with the same modulation method, as the value of R becomes smaller, the transmission rate becomes slower.

In Table A-1 and Table A-2 shown in FIG. 4, the value of Nss indicates the number of the MIMO spatial streams. Table A-1 and Table A-2 clearly show that in Table A-1, for which the value of Nss is smaller, the transmission rates are slower, even if the modulation method and the value of R are the same.

FIG. 5 shows an example of a specification that prescribes modulation methods, coding rates, and transmission rates in the IEEE 802.11a protocol. Even in the IEEE 802.11a protocol, it is possible to change the transmission rate freely by selecting the modulation method, the coding rate, and the like in accordance with the specification.

In addition to the changing of the transmission rate, the occurrence of errors may also be inhibited by increasing the transmission power during the packet retransmission to more than the normal power. In that case, a block is provided in FIG. 1 for a transmission power revision portion instead of the transmission rate revision portion 26. The transmission power revision portion increases the transmission power at the same time that the transmission rate is lowered during the retransmission of the packets described above. The increasing of the transmission power may be done in conjunction with the lowering of the transmission rate, but the transmission power may also be increased without any change being made to the transmission rate.

Second Embodiment

Figure 6:
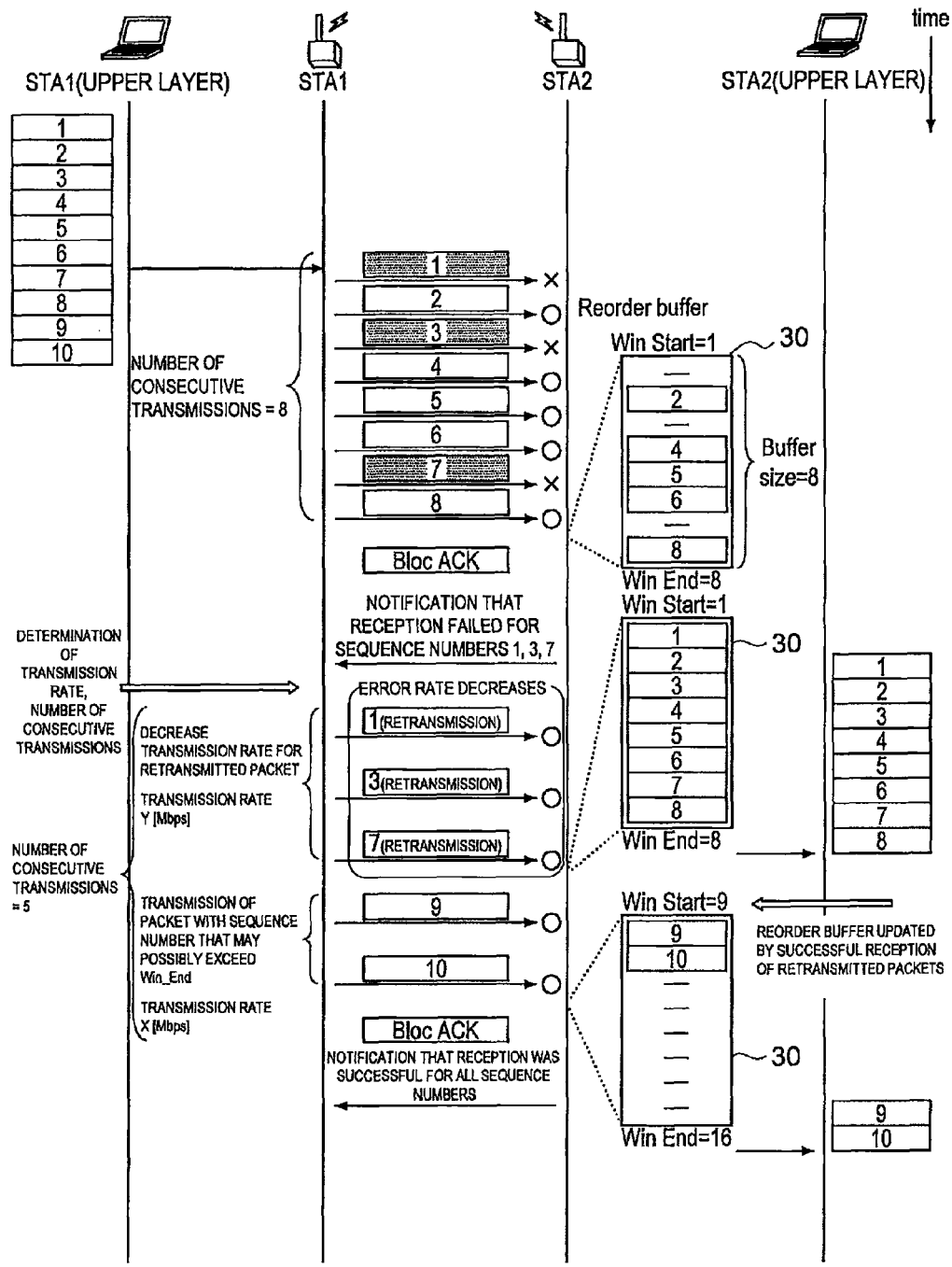
FIG. 6 is a figure that shows an example of an operation of the transmission device according to a second embodiment.

Next, a second embodiment of the present invention will be explained. FIG. 6 is a figure that shows an example of an operation of the transmission device 100 according to the second embodiment. The operation in FIG. 6 is the same as that in FIG. 3 up to and including the receiving of the Block ACK by STA1. As shown in FIG. 6, the transmitting side STA1 receives the Block ACK, acquiring information on the state of the reorder buffer 30 of the receiving side STA2 in the same manner as in the first embodiment. STA1 determines the transmission rate to be used when the retransmission of the packets starts, as well as the number of consecutive transmissions, as described below.

Five packets (with the sequence numbers 1, 3, 7, 9, and 10) reside in the data buffer 12, including the packets to be retransmitted, so STA1 sets the number of the packets to be consecutively transmitted to five. Based on the Block ACK, STA1 infers the value of Win_End for the reorder buffer 30 of STA2. Based on the fact that the value of Win_End is 8 and the highest sequence number among the five packets that will be consecutively transmitted is 10 (for the packet 10), STA1 recognizes the possibility that the consecutive transmission of the five packets will exceed the value of Win_End for the reorder buffer 30 of STA2.

Based on the Block ACK, the retransmission control portion 24 of STA1 recognizes that the packets 1, 3, and 7, with the sequence numbers 1, 3, and 7, are the packets to be retransmitted and sends that information to the transmission rate revision portion 26. For the retransmitted packets 1, 3, and 7 only, the transmission rate revision portion 26 sets the transmission rate to a lower rate (Y Mbps) than the normal transmission rate. The transmission rate revision portion 26 transmits the packets 9 and 10 at the normal transmission rate, that is, the transmission rate (X Mbps, where X is greater than Y) that was determined by the transmission rate control portion 20.

Therefore, the probability of successful transmissions increases for the retransmitted packets 1, 3, and 7 that are transmitted at the lower rate. Accordingly, once the retransmitted packets are successfully received on the STA2 side, the packets in the reorder buffer 30 are sent to the upper layer. As shown in FIG. 6, lowering the transmission rate means that all of the retransmitted packets 1, 3, 7, 9 and 10, are successfully received, and the packets 1 to 8 are held in the reorder buffer 30. Then, while the packets 9 and 10 are being received, the packets 1 to 8 are sent to the upper layer, and the state of the reorder buffer 30 is updated.

When the state of the reorder buffer 30 is updated, the value of Win_Start becomes 9, and the value of Win_End becomes 16. Therefore, in the case where the consecutive transmission of the five packets 1, 3, 7, 9, and 10 is performed, the highest sequence number is 10, so the reception of a packet with a sequence number that is greater than Win_End (16) does not occur on the STA2 side. Therefore, when the packets 9 and 10 are received, they are held in the updated reorder buffer 30 and are sent to the upper layer. It thus becomes possible to reliably decrease the probability that a gap will occur in the packets that are received by the upper layer.

In the second embodiment, the transmission rate is set to lower than the normal rate only for the retransmitted packets 1, 3, and 7, and the packets 9 and 10 are transmitted at the normal transmission rate, so it becomes possible to improve the throughput of the consecutive transmission even more.

Third Embodiment

Next, a third embodiment of the present invention will be explained. FIG. 7 is a figure that shows an example of an operation of the transmission device 100 according to the third embodiment. The operation in FIG. 7 is the same as that in FIG. 3 up to and including the receiving of the Block ACK by STA1. As shown in FIG. 7, the transmitting side STA1 receives the Block ACK, acquiring information on the state of the reorder buffer 30 of the receiving side STA2 in the same manner as in the first embodiment. STA1 determines the transmission rate to be used when the retransmission of the packets starts, as well as the number of consecutive transmissions, as described below.

Five packets (with the sequence numbers 1, 3, 7, 9, and 10) reside in the data buffer 12, including the packets 1, 3, and 7 that are to be retransmitted, so STA1 sets the number of the packets to be consecutively transmitted to five. From the Block ACK, STA1 acquires the value of Win_End for the reorder buffer 30 of STA2. Based on the fact that the value of Win_End is 8 and the highest sequence number among the five packets that will be consecutively transmitted is 10 (for the packet 10), STA1 recognizes the possibility that the consecutive transmission of the five packets will exceed the value of Win_End for the reorder buffer 30 of STA2.

In the execution of the consecutive transmission by STA1, when the consecutive transmission starts, the transmission rate revision portion 26 sets the transmission rate to a lower rate (Y1 Mbps, where X is greater than Y1) than the transmission rate (X Mbps) that is determined by the transmission rate control portion 20 in accordance with the wireless channel quality. The transmission rate revision portion 26 sets the transmission rate such that the transmission rate will gradually increase as the consecutive transmission proceeds. In this case, at the end of the consecutive transmission, the packets may be transmitted at one of a rate that is the same as the normal transmission rate (X Mbps) that is determined by the transmission rate control portion 20 and a rate (Y2 Mbps, where X is less than Y2) that is higher than the normal transmission rate.

The retransmitted packets 1, 3, and 7 are grouped together at the beginning of the consecutive transmission. For the retransmission of the packets, this increases the probability of successful transmissions for the retransmitted packets 1, 3, and 7 that are transmitted at the lower rate when the consecutive transmission starts. Accordingly, once the retransmitted packets are successfully received on the STA2 side, the packets in the reorder buffer 30 are sent to the upper layer. As shown in FIG. 7, lowering the transmission rate means that all of the retransmitted packets 1, 3, 7, 9 and 10, are successfully received, and the packets 1 to 8 are held in the reorder buffer 30. Then, while the packets 9 and 10 are being received, the packets 1 to 8 are sent to the upper layer, and the state of the reorder buffer 30 is updated.

When the state of the reorder buffer 30 is updated, the value of Win_Start becomes 9, and the value of Win_End becomes 16. Therefore, in the case where the consecutive transmission of the five packets 1, 3, 7, 9, and 10 is performed, the highest sequence number is 10, so the reception of a packet with a sequence number that is greater than Win_End (16) does not occur on the STA2 side. Therefore, when the packets 9 and 10 are received, they are held in the updated reorder buffer 30 and are sent to the upper layer. It thus becomes possible to reliably decrease the probability that a gap will occur in the packets that are received by the upper layer.

In the third embodiment, when the packets are retransmitted, the transmission rate is set to lower than the normal rate when the consecutive transmission starts. The transmission rate is then gradually increased as the consecutive transmission proceeds, such that at the end of the consecutive transmission, the packets may be transmitted at one of a rate that is the same as the normal transmission rate and a rate that is higher than the normal transmission rate. This makes it possible to improve the throughput of the consecutive transmission even more.

Fourth Embodiment

Next, a fourth embodiment of the present invention will be explained. In a wireless LAN system according to the IEEE 802.11n (draft) protocol, frame aggregation is defined as a form of consecutive packet transmission. In the fourth embodiment, in communication that uses frame aggregation, not only is the probability of a gap in the received packets in the upper layer reduced by the performing of the same sorts of operations as in the first embodiment, but the number of consecutive transmissions (the number of aggregated packets) is also increased.

FIGS. 8A and 8B are figures that show a frame burst and a frame aggregation. FIG. 8A shows the frame burst, and FIG. 8B shows the frame aggregation. More specifically, FIG. 8B shows an example of an A-MPDU aggregation, which is one example of the frame aggregation.

In the frame aggregation in FIG. 8B, in contrast to the frame burst in FIG. 8A, which is the normal form of the consecutive transmission, a preamble and a PHY header are omitted for a second packet (the packet 2) and all subsequent packets. Furthermore, no interframe spaces exist between the packets, so the transmission efficiency can be increased over that of the frame burst.

Figure 9:
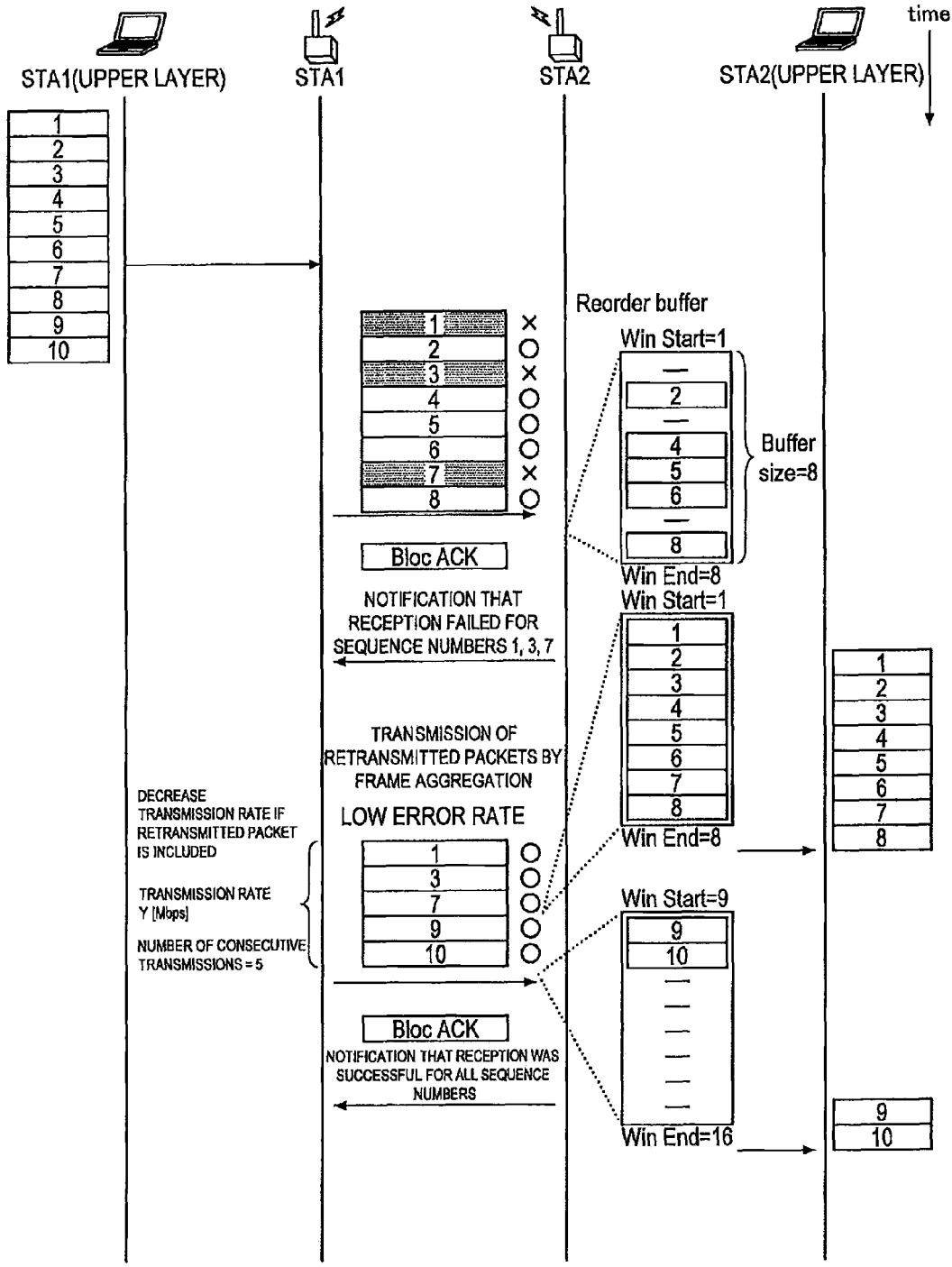
FIG. 9 is a figure that shows an example of an operation of the transmission device according to a fourth embodiment.

FIG. 9 is a figure that shows an example of an operation of the transmission device 100 according to the fourth embodiment. In the present embodiment, during the first transmission, the packets 1 to 8 with the sequence numbers 1 to 8 are transmitted consecutively in one frame aggregation. After the consecutive transmission of the packets 1 to 8, STA1 receives the Block ACK from STA2, thus acquiring information on the state of the reorder buffer 30 of STA2, which is the receiving side terminal. STA1, which is the transmitting side, receives the Block ACK and, in the same manner as in the first embodiment, acquires the state of the reorder buffer 30 of STA2, which is the receiving side.

Five packets (with the sequence numbers 1, 3, 7, 9, and 10) reside in the data buffer 12, including the packets to be retransmitted, so STA1 sets the number of the packets to be consecutively transmitted in the frame aggregation to five. Based on the Block ACK, STA1 acquires the value of Win_End for the reorder buffer 30 of STA2. Based on the fact that the value of Win_End is 8 and the highest sequence number among the five packets that will be consecutively transmitted is 10 (for the packet 10), STA1 recognizes the possibility that the consecutive transmission of the five packets will exceed the value of Win_End for the reorder buffer 30 of STA2.

The consecutive transmission control portion 28 of the transmission device 100 sets the number of packets (the number of aggregated packets) in the frame aggregation to five. The packet transmission preparation portion 10 prepares the frame aggregation of the packets to be consecutively transmitted as one frame aggregation of the packets 1, 3, 7, 9, and 10. The transmission rate revision portion 26 sets the transmission rate for the transmission of the packets 1, 3, 7, 9, and 10 in the frame aggregation to a rate (Y Mbps) that is lower than normal. Therefore, the probability of successful transmissions increases for the retransmitted packets 1, 3, and 7 that are transmitted in the frame aggregation. Accordingly, once the retransmitted packets are successfully received on the STA2 side, the packets in the reorder buffer 30 are sent to the upper layer. As shown in FIG. 9, lowering the transmission rate means that all of the retransmitted packets 1, 3, 7, 9 and 10, are successfully received, and the packets 1 to 8 are held in the reorder buffer 30. Then, while the packets 9 and 10 are being received, the packets 1 to 8 are sent to the upper layer, and the state of the reorder buffer 30 is updated.

When the state of the reorder buffer 30 is updated, the value of Win_Start becomes 9, and the value of Win_End becomes 16. Therefore, in the case where the consecutive transmission of the five packets 1, 3, 7, 9, and 10 is performed, the highest sequence number is 10, so the reception of a packet with a sequence number that is greater than Win_End (16) does not occur on the STA2 side. Therefore, when the packets 9 and 10 are received, they are held in the updated reorder buffer 30 and are sent to the upper layer. It thus becomes possible to reliably decrease the probability that a gap will occur in the packets that are received by the upper layer.

Therefore, according to the fourth embodiment, the five packets 1, 3, 7, 9, and 10 can be transmitted in the frame aggregation during the retransmission, so not only is the probability of a gap in the received packets in the upper layer reduced, but the number of consecutive transmissions (the number of aggregated packets) can also be increased by the frame aggregation.

Fifth Embodiment

Figure 10:
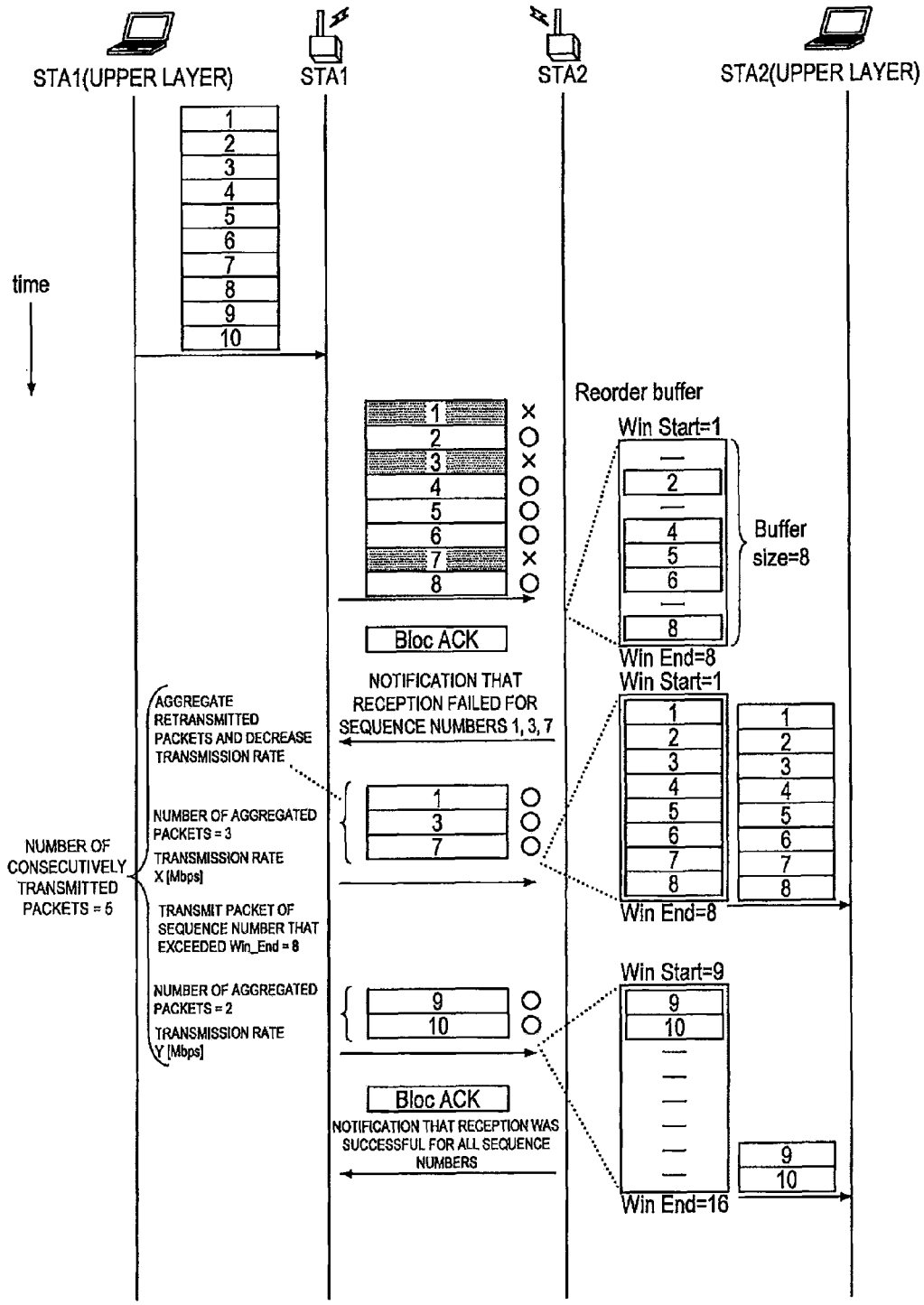
FIG. 10 is a figure that shows an example of an operation of the transmission device according to a fifth embodiment.
Figure 11:
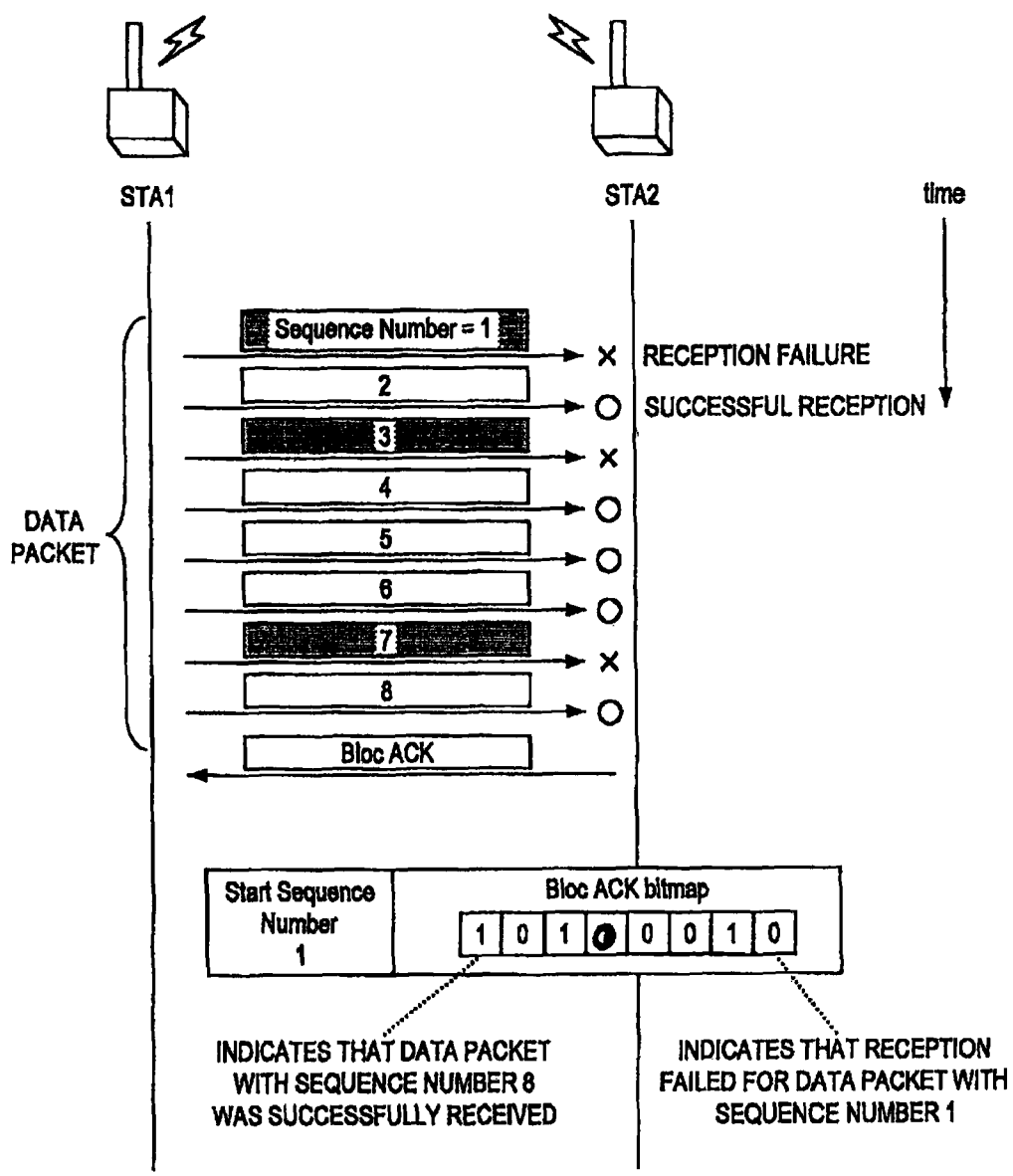
FIG. 11 is a figure for explaining a Block ACK mechanism.
Figure 12:
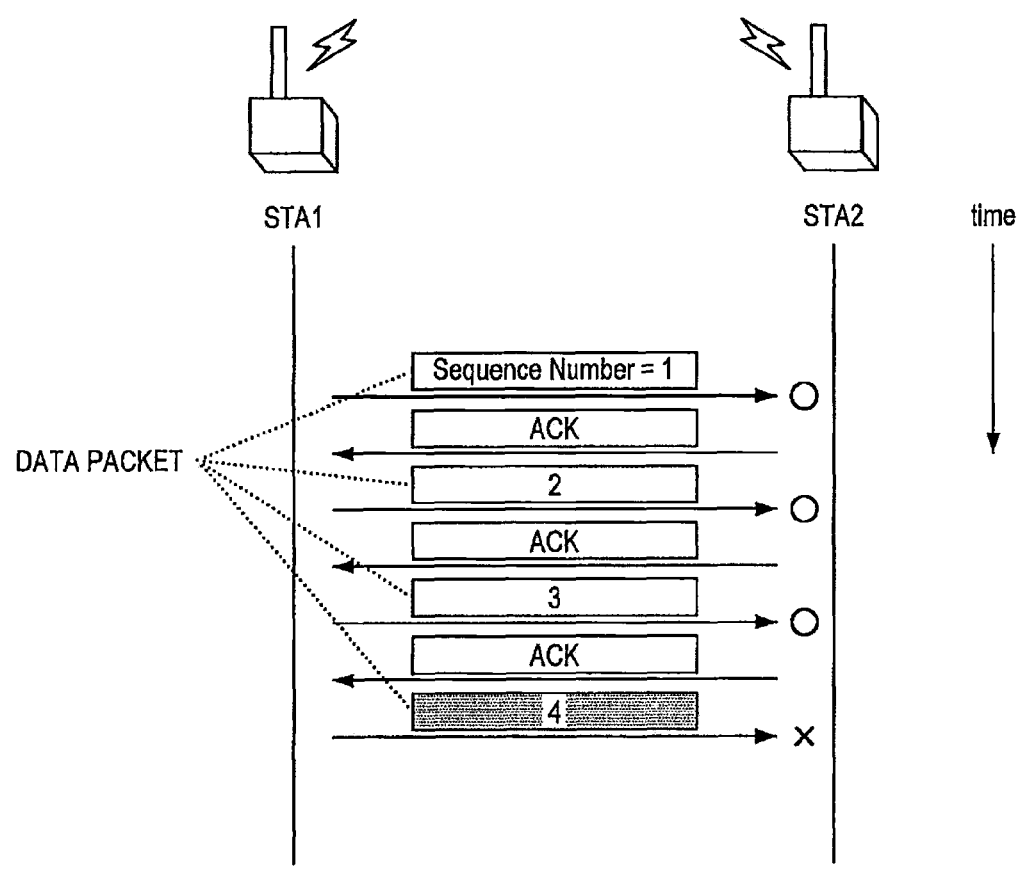
FIG. 12 is a figure that shows a case in which one ACK is received for one packet.
Figure 13:
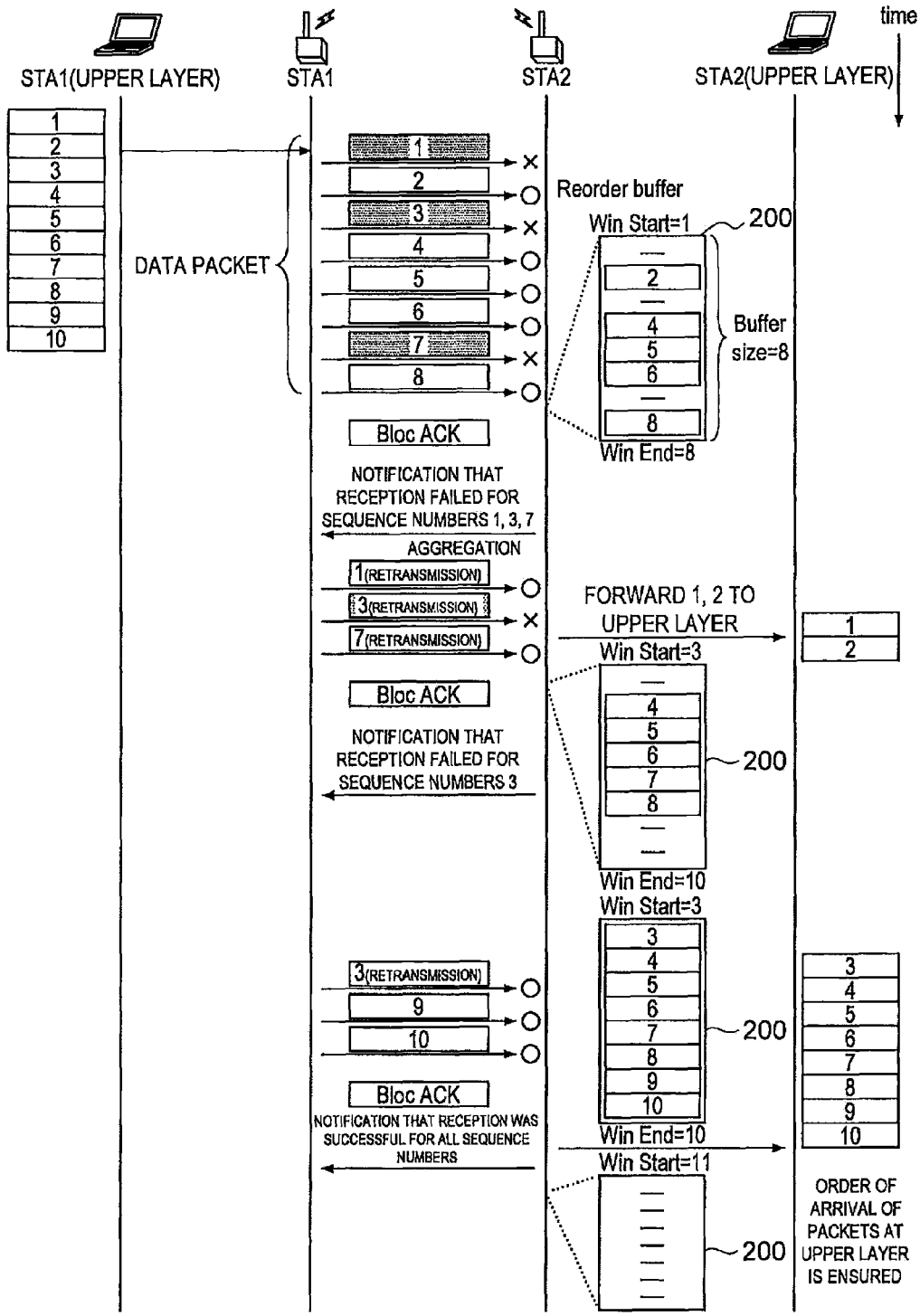
FIG. 13 is a figure that shows a system that uses a reorder buffer.
Figure 14:
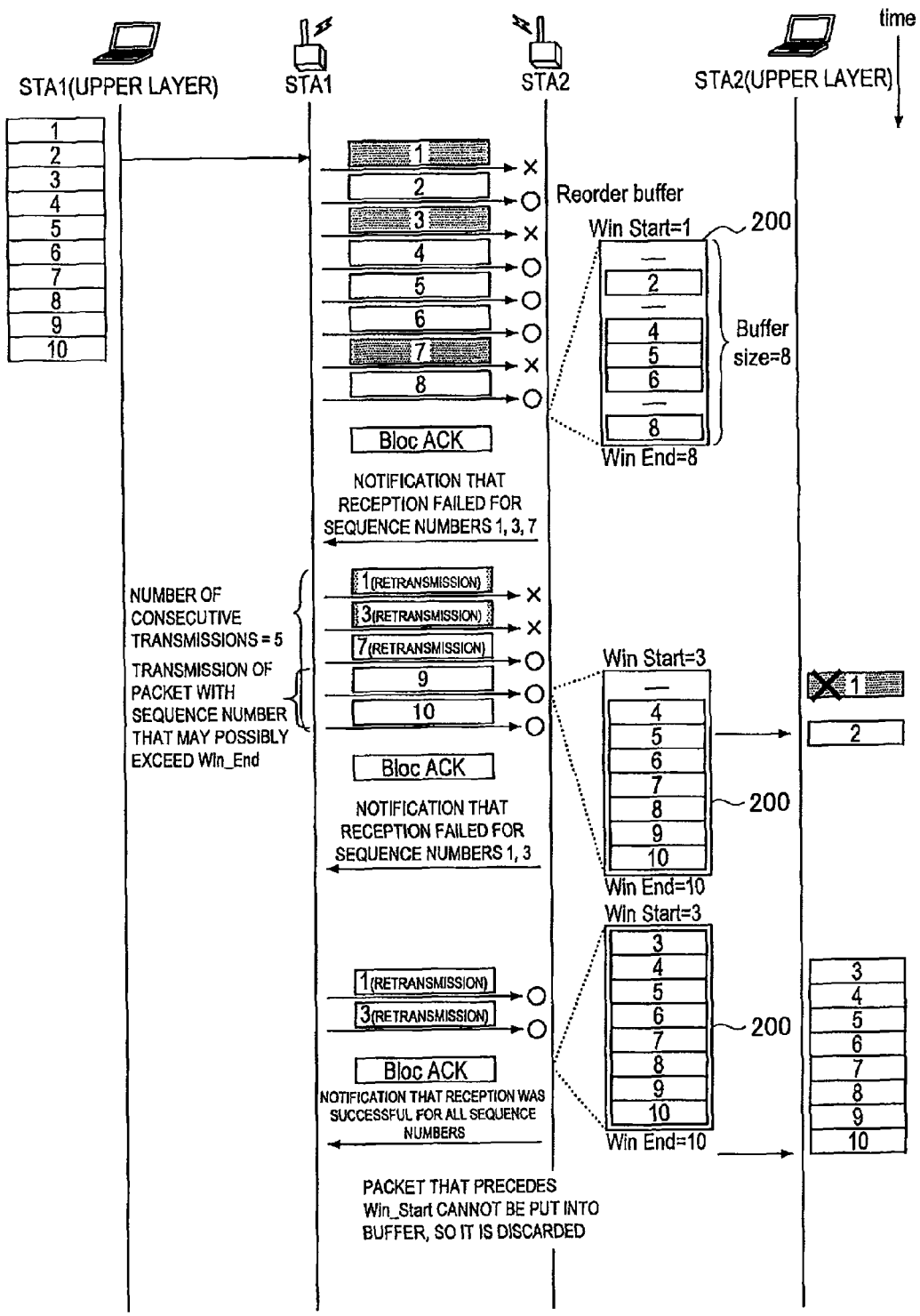
FIG. 14 is a figure for explaining a problem in which a gap in received packets occurs in the system that uses the reorder buffer.
Figure 15:
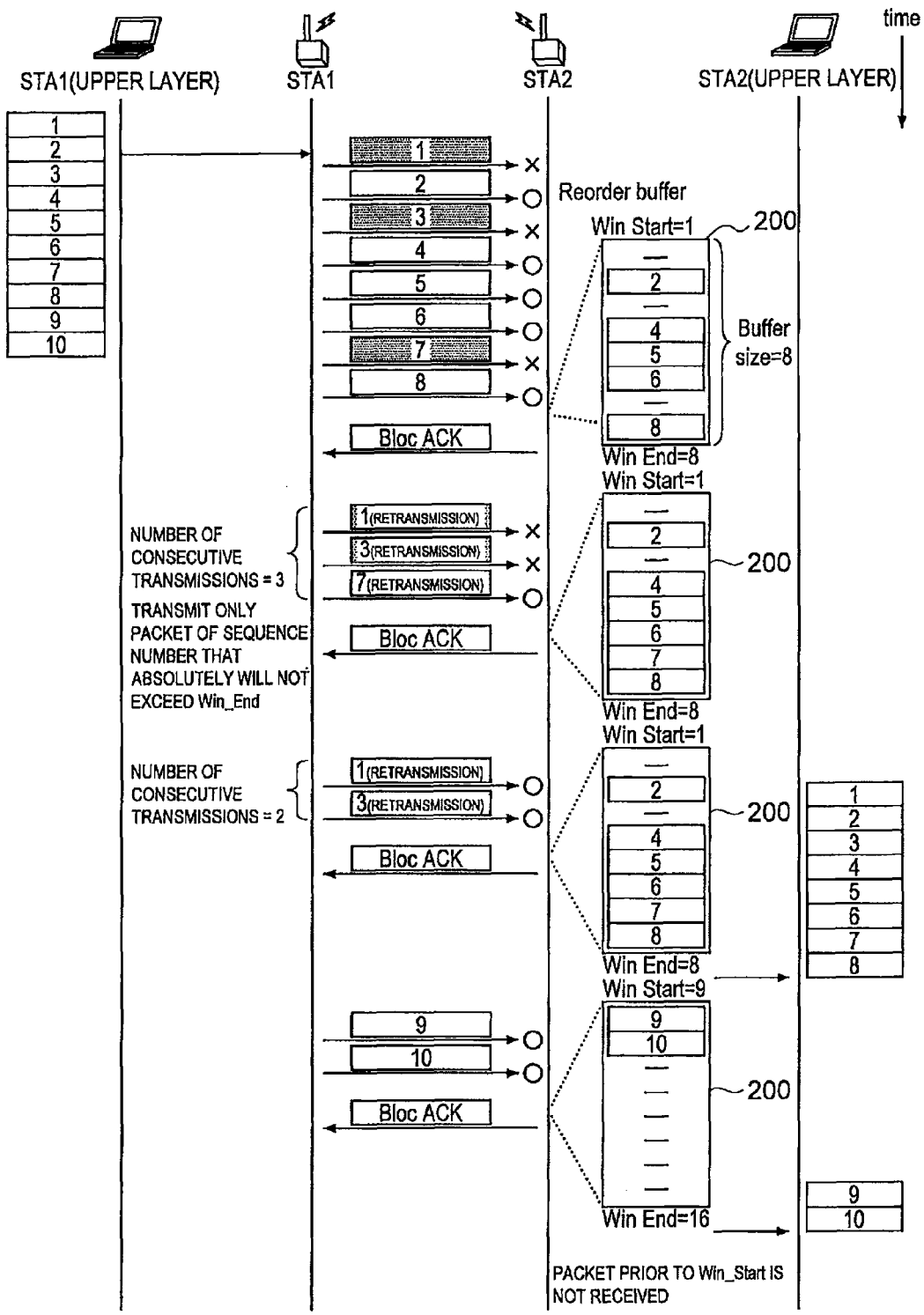
FIG. 15 is a figure that shows a case in which the number of consecutive transmissions is restricted in FIG. 14.

Next, a fifth embodiment of the present invention will be explained. FIG. 10 is a figure that shows an example of an operation of the transmission device 100 according to the fifth embodiment. The fifth embodiment uses a combination of the frame aggregation and the frame burst and changes the transmission rate in the course of the consecutive transmission.

Up to and including the receiving of the Block ACK by STA1, the operation in FIG. 10 is performed using the frame burst in the same manner as in the first embodiment. Five packets reside in the data buffer 12, including the packets 1, 3, and 7 that are to be retransmitted, so STA1 sets the number of the packets to be consecutively transmitted in the frame aggregation to five. Based on the Block ACK, STA1 acquires the value of Win_End for the reorder buffer 30 of STA2. Based on the fact that the value of Win_End is 8 and the highest sequence number among the five packets that will be consecutively transmitted is 10 (for the packet 10), STA1 recognizes the possibility that the consecutive transmission of the five packets will exceed the value of Win_End for the reorder buffer 30 of STA2.

Using the frame aggregation, STA1 retransmits the packets 1, 3, and 7 that are to be retransmitted. The retransmission is carried out at a rate (Y Mbps) that is lower than normal. The packets 9 and 10 that exceed the value of Win_End (8) are transmitted in a separate frame aggregation from that used for the packets 1, 3, and 7. The frame aggregation for the packets 9 and 10 is transmitted at a higher transmission rate than was the frame aggregation for the packets 1, 3, and 7.

As explained above, according to the fifth embodiment, the packets are transmitted during the retransmission stage using a plurality of the frame aggregations, so the transmission rates that are used for the frame aggregation for the packets 1, 3, and 7 and for the frame aggregation for the packets 9 and 10 can be varied. Therefore, making the transmission rate for the frame aggregation for the packets 9 and 10 higher than the transmission rate for frame aggregation for the packets 1, 3, and 7, for which reception failed, makes it possible to improve the throughput of the consecutive transmission even more.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless transmission device, comprising:
   a packet transmission portion that transmits a plurality of packets to a receiving terminal;
   a reply data receiving portion that receives reply data that is received from the receiving terminal after the plurality of the packets are transmitted;
   a transmission packet determination portion that determines a plurality of the packets to be consecutively transmitted, based on the reply data;
   a transmission conditions revision portion that revises at least one of a transmission rate and a transmission power that are used when the plurality of the packets are consecutively transmitted from a value that is normally used in accordance with a wireless channel quality; and
   an end point number acquisition portion that, based on the reply data, acquires an end point number for the packets that can be held in a data buffer of the receiving terminal,
   wherein the transmission conditions revision portion revises at least one of the transmission rate and the transmission power that are used when the plurality of the packets are consecutively transmitted, in a case where a sequence number for a packet that has been set for the consecutive transmission exceeds the end point number.

2. The wireless transmission device according to claim 1, wherein the revision of the transmission rate includes at least one of a change of a modulation method, a change of a redundancy of an error correcting code, and a change of a MIMO communication spatial multiplexing parameter.

3. The wireless transmission device according to claim 2, wherein the revision of the transmission rate is performed with priority given to the changing of the modulation method.

4. The wireless transmission device according to claim 1, further comprising:
   a transmission rate control portion that determines the transmission rate in accordance with the wireless channel quality,
   wherein the transmission conditions revision portion sets the transmission rate during at least a portion of the time that the plurality of the packets are consecutively transmitted to a lower value than the transmission rate that is determined by the transmission rate control portion.

5. The wireless transmission device according to claim 3, wherein the consecutively transmitted packets include at least one retransmitted packet and at least one newly transmitted packet, and the transmission conditions revision portion sets the transmission rate during the transmission of the at least one retransmitted packet to a lower value than the transmission rate that is determined by the transmission rate control portion.

6. The wireless transmission device according to claim 5, wherein the transmission conditions revision portion sets the transmission rate during the transmission of the at least one newly transmitted packet to one of the same value as the transmission rate that is determined by the transmission rate control portion and a higher value than the transmission rate that is determined by the transmission rate control portion.

7. The wireless transmission device according to claim 4, wherein the transmission conditions revision portion, at the start of the consecutive transmission, sets the transmission rate to a lower value than the transmission rate that is determined by the transmission rate control portion and, after the start of the consecutive transmission, increases the transmission rate according to the number of the transmitted packets.

8. The wireless transmission device according to claim 1, further comprising:
   a consecutive transmission control portion that controls the number of the packets that are consecutively transmitted in order to transmit the consecutively transmitted packets using a frame aggregation,
   wherein the transmission conditions revision portion sets the transmission rate during at least a portion of the time that the plurality of the packets are consecutively transmitted using the frame aggregation to a lower value than the value that is normally used.

9. The wireless transmission device according to claim 8, wherein the transmission conditions revision portion changes the transmission rate for a plurality of the frame aggregations that are transmitted during the consecutive transmission.

10. The wireless transmission device according to claim 1, wherein the transmission conditions revision portion increases the transmission power during the consecutive transmission to a higher value than the value that is normally used.

11. A wireless transmission method, comprising the steps of:
   transmitting a plurality of packets to a receiving terminal;
   receiving reply data that is received from the receiving terminal after the plurality of the packets are transmitted;

determining a plurality of the packets to be consecutively transmitted, based on the reply data;

revising at least one of a transmission rate and a transmission power that are used when the plurality of the packets are consecutively transmitted from a value that is normally used in accordance with a wireless channel quality;

acquiring an end point number for the packets that can be held in a data buffer of the receiving terminal, based on the reply data; and revising at least one of the transmission rate and the transmission power that are used when the plurality of the packets are consecutively transmitted, in a case where a sequence number for a packet that has been set for the consecutive transmission exceeds the end point number.

12. A wireless communication system that comprises a transmission device and a reception device that are connected through a wireless communication network, wherein the transmission device includes a packet transmission portion that transmits a plurality of packets to a receiving terminal, a reply data receiving portion that receives reply data that is received from the receiving terminal after the plurality of the packets are transmitted, a transmission packet determination portion that determines a plurality of the packets to be consecutively transmitted, based on the reply data, a transmission conditions revision portion that revises at least one of a transmission rate and a transmission power that are used when the plurality of the packets are consecutively transmitted from a value that is normally used in accordance with a wireless channel quality; and an end point number acquisition portion that, based on the reply data, acquires an end point number for the packets that can be held in a data buffer of the receiving terminal, wherein the transmission conditions revision portion revises at least one of the transmission rate and the transmission power that are used when the plurality of the packets are consecutively transmitted, in a case where a sequence number for a packet that has been set for the consecutive transmission exceeds the end point number.

13. A non-transitory computer readable storage medium storing a computer program, which when executed by a computer performs a method, the method comprising the steps of:

transmitting a plurality of packets to a receiving terminal;

receiving reply data that is received from the receiving terminal after the plurality of the packets are transmitted;

determining a plurality of the packets to be consecutively transmitted, based on the reply data;

revising at least one of a transmission rate and a transmission power that are used when the plurality of the packets are consecutively transmitted from a value that is normally used in accordance with a wireless channel quality;

acquiring an end point number for the packets that can be held in a data buffer of the receiving terminal, based on the reply data; and revising at least one of the transmission rate and the transmission power that are used when the plurality of the packets are consecutively transmitted, in a case where a sequence number for a packet that has been set for the consecutive transmission exceeds the end point number.

* * * * *